(12) United States Patent
Lessard et al.

(10) Patent No.: US 11,839,345 B2
(45) Date of Patent: Dec. 12, 2023

(54) ROBOTIC CLEANER

(71) Applicant: SHARKNINJA OPERATING LLC, Needham, MA (US)

(72) Inventors: Derek A. Lessard, Cambridge, MA (US); Justin West, North Andover, MA (US)

(73) Assignee: SharkNinja Operating LLC, Needham, MA (US)

( * ) Notice: Subject to any disclaimer, the term of this patent is extended or adjusted under 35 U.S.C. 154(b) by 54 days.

(21) Appl. No.: 17/508,412

(22) Filed: Oct. 22, 2021

(65) Prior Publication Data
US 2022/0125256 A1    Apr. 28, 2022

Related U.S. Application Data

(60) Provisional application No. 63/104,768, filed on Oct. 23, 2020.

(51) Int. Cl.
*A47L 9/00*  (2006.01)
*A47L 9/04*  (2006.01)
(Continued)

(52) U.S. Cl.
CPC ............ *A47L 9/009* (2013.01); *A47L 9/0411* (2013.01); *A47L 9/0477* (2013.01); *A47L 9/22* (2013.01); *A47L 9/2805* (2013.01); *A47L 9/2852* (2013.01); *A47L 11/282* (2013.01); *A47L 11/4002* (2013.01); *A47L 11/4011* (2013.01); *A47L 11/4041* (2013.01);
(Continued)

(58) Field of Classification Search
CPC .......................... A47L 11/282; A47L 11/4011; A47L 11/4061; A47L 2201/00; A47L 2201/04; A47L 2201/06; A47L 7/009; A47L 9/28; A47L 9/2805; A47L 9/2831; A47L 9/2836; A47L 9/2852; G05D 1/0238; G05D 2201/0215; G05D 2201/0203
See application file for complete search history.

(56) References Cited

U.S. PATENT DOCUMENTS 8,032,978 B2   10/2011   Haegermarck
10,219,665 B2   3/2019   Haegermarck
(Continued)

FOREIGN PATENT DOCUMENTS

DE   102007036161 A1 *  2/2009   ............ A47L 9/0411
EP       2420169 A1 *  2/2012   ............ A47L 9/009
(Continued)

OTHER PUBLICATIONS

Translation of DE 102007036161 A1 (Year: 2009).*
(Continued)

*Primary Examiner* — Don M Anderson
*Assistant Examiner* — Steven Huang
(74) *Attorney, Agent, or Firm* — Grossman Tucker Perreault & Pfleger, PLLC

(57) ABSTRACT

A robotic cleaner may include a chassis, a single drive wheel rotatably coupled to the chassis, the single drive wheel being configured to rotate about a steering axis and a drive axis, an agitator chamber having an agitator rotatable therein, and a cleaning motor assembly configured to cause the agitator to rotate and further configured to cause air to flow into the agitator chamber.

16 Claims, 6 Drawing Sheets

(51) Int. Cl.
*A47L 9/22* (2006.01)
*A47L 9/28* (2006.01)
*G05D 1/02* (2020.01)
*A47L 11/282* (2006.01)
*A47L 11/40* (2006.01)

(52) U.S. Cl.
CPC ....... *A47L 11/4061* (2013.01); *A47L 11/4066* (2013.01); *A47L 11/4069* (2013.01); *A47L 11/4072* (2013.01); *G05D 1/0238* (2013.01); *A47L 2201/04* (2013.01); *G05D 2201/0215* (2013.01)

(56) References Cited

U.S. PATENT DOCUMENTS

| | | | |
|---|---|---|---|
| 11,036,230 B1* | 6/2021 | Ebrahimi Afrouzi | ................. G05D 1/0016 |
| 2005/0046373 A1* | 3/2005 | Aldred | ............. A47L 9/009 318/580 |
| 2008/0249661 A1* | 10/2008 | Hong | ............. G05D 1/0219 901/1 |
| 2009/0126143 A1* | 5/2009 | Haegermarck | ........... A47L 9/00 15/319 |
| 2011/0202175 A1* | 8/2011 | Romanov | ........... A47L 11/4036 700/250 |
| 2012/0199006 A1* | 8/2012 | Swett | ................. A47L 9/22 96/417 |
| 2017/0156560 A1* | 6/2017 | Jung | ................. G05D 1/0223 |
| 2017/0332862 A1 | 11/2017 | Jun et al. | |
| 2019/0223679 A1 | 7/2019 | Schnittman et al. | |
| 2020/0022543 A1 | 1/2020 | Gill et al. | |
| 2020/0205636 A1 | 7/2020 | Johnson et al. | |
| 2021/0007570 A1* | 1/2021 | Kayama | ............. G05D 1/0227 |

FOREIGN PATENT DOCUMENTS

| | | | | |
|---|---|---|---|---|
| GB | 2566959 A | * | 4/2019 | ............. A47L 11/28 |
| JP | H10105236 A | * | 9/1996 | |
| KR | 20040013383 | | 2/2004 | |

OTHER PUBLICATIONS

Translation of JP H10105236 A (Year: 1996).*
PCT Search Report and Written Opinion dated Jan. 28, 2022, received in corresponding PCT Application No. US2021/056244, 10 pages.

\* cited by examiner

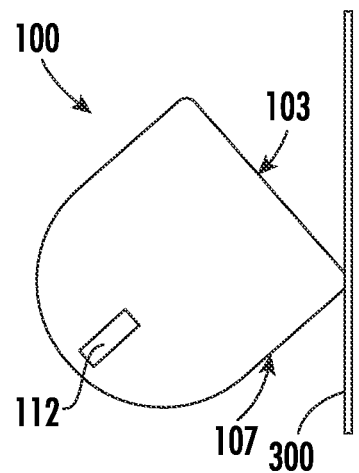
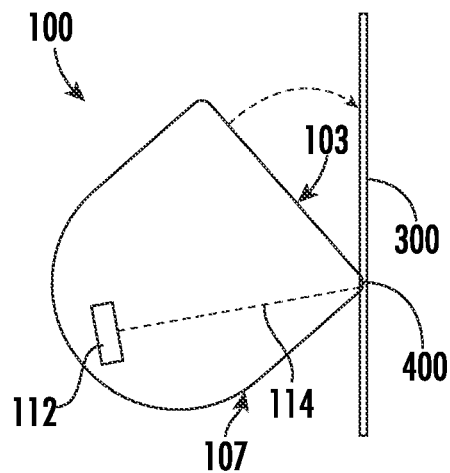
FIG. 3　　　　　　　　FIG. 4
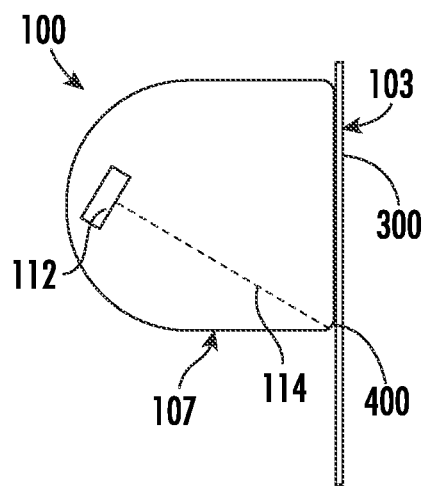
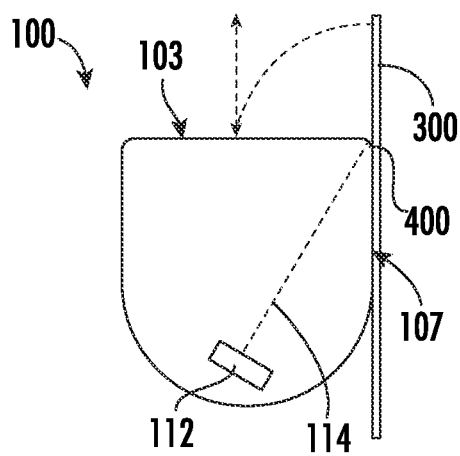
FIG. 5　　　　　　　　FIG. 6

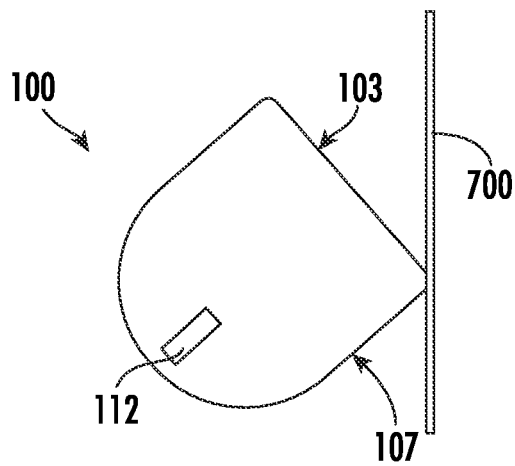
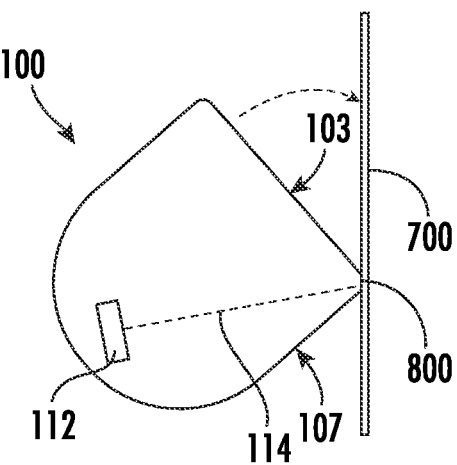
FIG. 7      FIG. 8
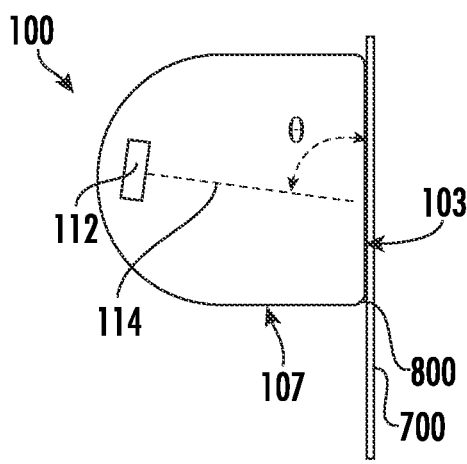
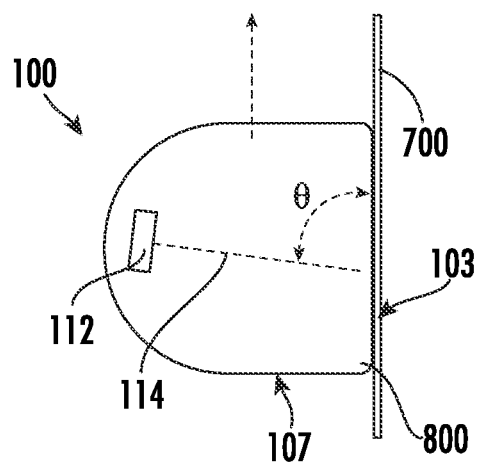
FIG. 9      FIG. 10

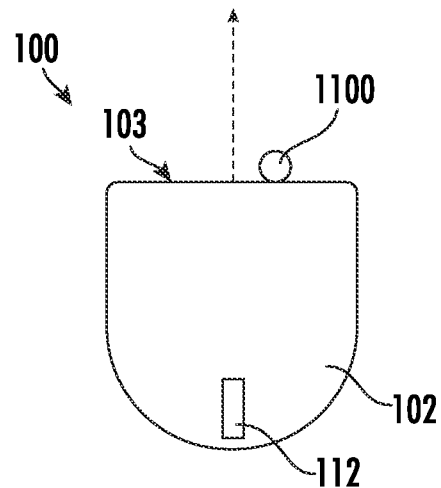
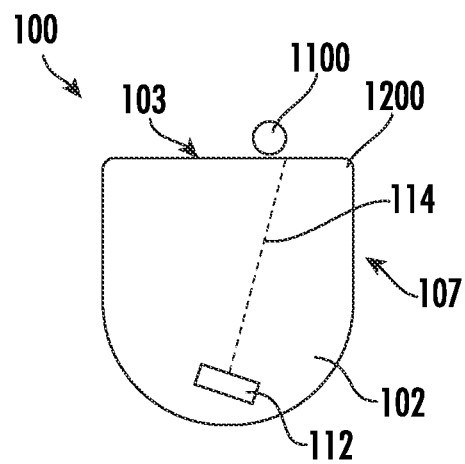
FIG. 11          FIG. 12
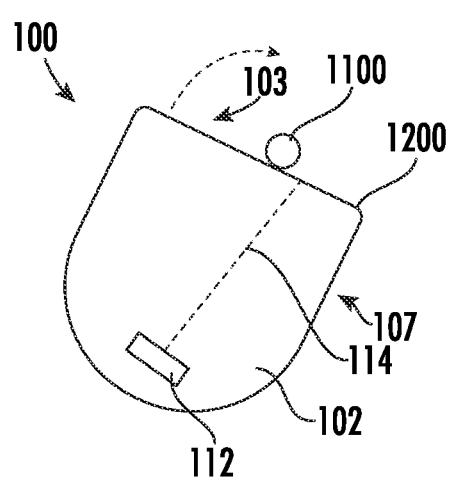
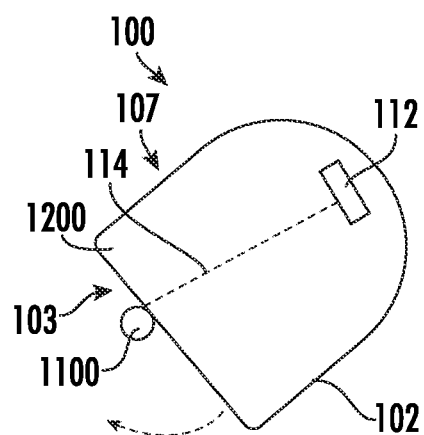
FIG. 13          FIG. 14

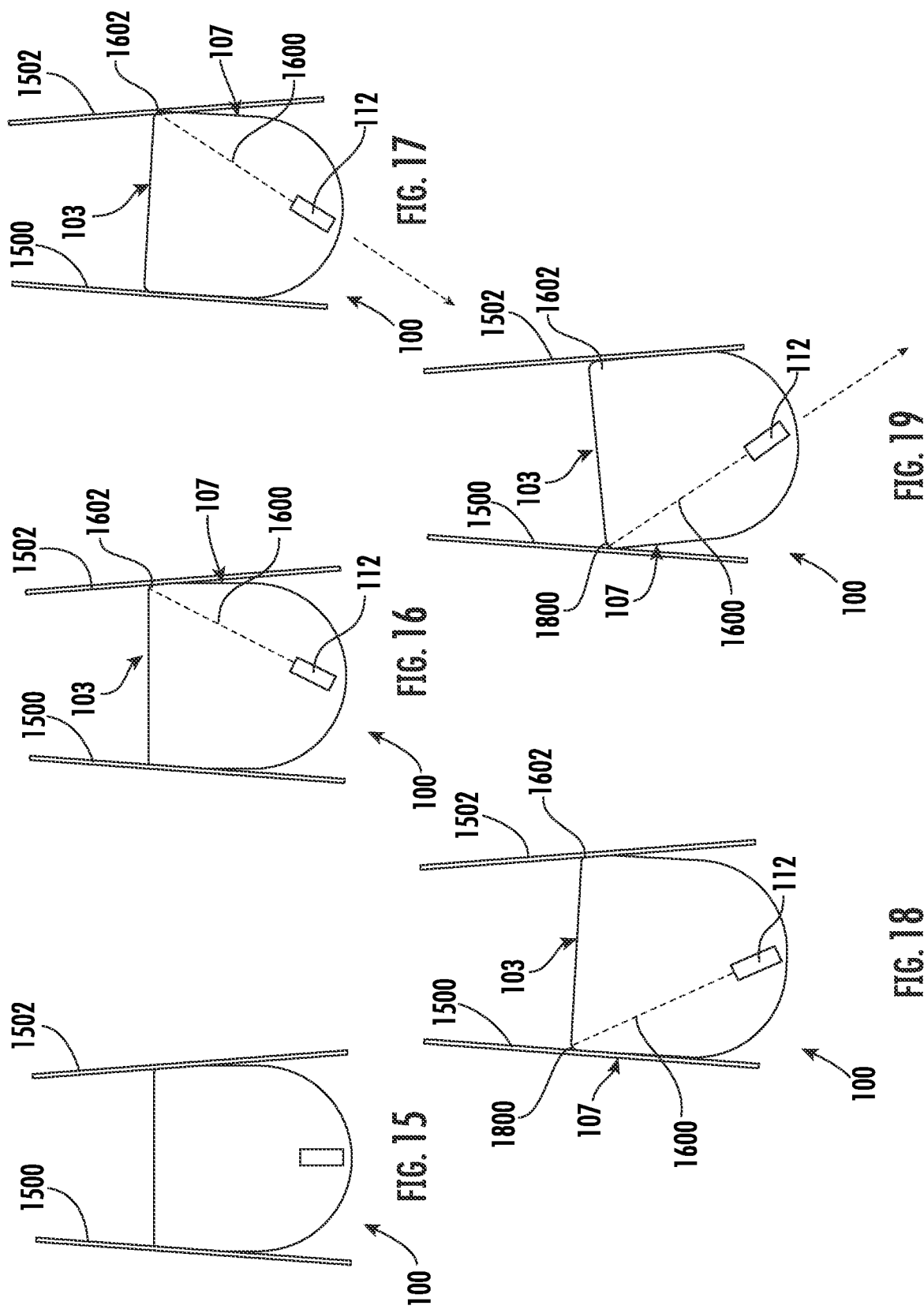

ROBOTIC CLEANER

CROSS-REFERENCE TO RELATED APPLICATIONS

The present application claims the benefit of U.S. Provisional Application Ser. No. 63/104,768 filed on Oct. 23, 2020, entitled Robotic Cleaner, which is fully incorporated herein by reference.

TECHNICAL FIELD

The present disclosure generally relates to surface treatment apparatuses and more specifically to robotic cleaners.

BACKGROUND INFORMATION

Robotic cleaners have become an increasingly popular appliance for automated cleaning applications. Robotic cleaners may move autonomously along a surface to be cleaned (e.g., a floor), while cleaning the surface. An example of a robotic cleaner may include a robotic vacuum cleaner. A robotic vacuum cleaner may include a suction motor configured to generate suction at a suction inlet, an agitator (e.g., a brush roll) configured to engage a surface to be cleaned, and a dust cup configured to collect debris from the surface to be cleaned.

BRIEF DESCRIPTION OF THE DRAWINGS

These and other features and advantages will be better understood by reading the following detailed description, taken together with the drawings wherein:

FIG. 3 shows an example of the robotic cleaner of FIG. 1A engaging a vertically extending surface, consistent with embodiments of the present disclosure.

FIG. 4 shows an example of the robotic cleaner of FIG. 3 rotating towards the vertically extending surface, consistent with embodiments of the present disclosure.

FIG. 5 shows an example of the robotic cleaner of FIG. 4 aligning a forward surface of the robotic cleaner with the vertically extending surface, consistent with embodiments of the present disclosure.

FIG. 6 shows an example of the robotic cleaner of FIG. 5 reversing from the vertically extending surface until a side surface of the robotic cleaner aligns with the vertically extending surface, consistent with embodiments of the present disclosure.

FIG. 7 shows an example of the robotic cleaner of FIG. 1A engaging a vertically extending surface, consistent with embodiments of the present disclosure.

FIG. 8 shows an example of the robotic cleaner of FIG. 7 rotating towards the vertically extending surface, consistent with embodiments of the present disclosure.

FIG. 9 shows an example of the robotic cleaner of FIG. 8 aligning a forward surface of the robotic cleaner with the vertically extending surface, consistent with embodiments of the present disclosure.

FIG. 10 shows an example of the robotic cleaner of FIG. 9 moving along the vertically extending surface, consistent with embodiments of the present disclosure.

FIG. 11 shows an example of the robotic cleaner of FIG. 1A engaging an obstacle, consistent with embodiments of the present disclosure.

FIG. 12 shows an example of the robotic cleaner of FIG. 11 aligning with the obstacle, consistent with embodiments of the present disclosure.

FIG. 13 shows an example of the robotic cleaner of FIG. 12 moving about the obstacle, consistent with embodiments of the present disclosure.

FIG. 14 shows an example of the robotic cleaner of FIG. 13 continuing to move about the obstacle, consistent with embodiments of the present disclosure.

FIG. 15 shows an example of the robotic cleaner of FIG. 1A in a wedged condition, consistent with embodiments of the present disclosure.

FIG. 16 shows an example of the robotic cleaner of FIG. 15 adjusting to a first movement direction in an attempt to escape the wedged condition, consistent with embodiments of the present disclosure.

FIG. 17 shows an example of the robotic cleaner of FIG. 16 attempting to move according to the first adjusted movement direction, consistent with embodiments of the present disclosure.

FIG. 18 shows an example of the robotic cleaner of FIG. 17 adjusting to a second movement direction in an attempt to escape the wedged condition, consistent with embodiments of the present disclosure.

FIG. 19 shows an example of the robotic cleaner of FIG. 18 attempting to move according the second movement direction, consistent with embodiments of the present disclosure.

DETAILED DESCRIPTION

The present disclosure is generally directed to a robotic cleaner. The robotic cleaner includes a chassis, a dust cup removably coupled to the chassis, a drive wheel rotatably coupled to the chassis, an agitator chamber fluidly coupled to the dust cup, an agitator (e.g., brush roll) rotatably disposed within the agitator chamber, and a cleaning motor assembly configured to cause the agitator to rotate and further configured to generate airflow within the agitator chamber. The drive wheel and the agitator chamber can be positioned on opposing sides of a center line of the chassis of the robotic cleaner. The drive wheel can be configured to rotate about a drive axis and a steering axis, the drive axis extends substantially parallel to a surface to be cleaned and the steering axis extends transverse to (e.g., perpendicular to) the surface to be cleaned. As such, the drive wheel may be coupled to a drive motor and a steering motor, wherein the drive motor causes the drive wheel to rotate about the drive axis and the steering motor causes the drive wheel to rotate about the steering axis. Such a configuration may allow the robotic cleaner to be driven using a single drive wheel. The use of a single drive wheel and/or the use of the cleaning motor assembly to generate airflow and rotate the agitator may increase the volume available within the chassis for additional components and/or allow the overall size of the chassis to be reduced.

Figure 1A:
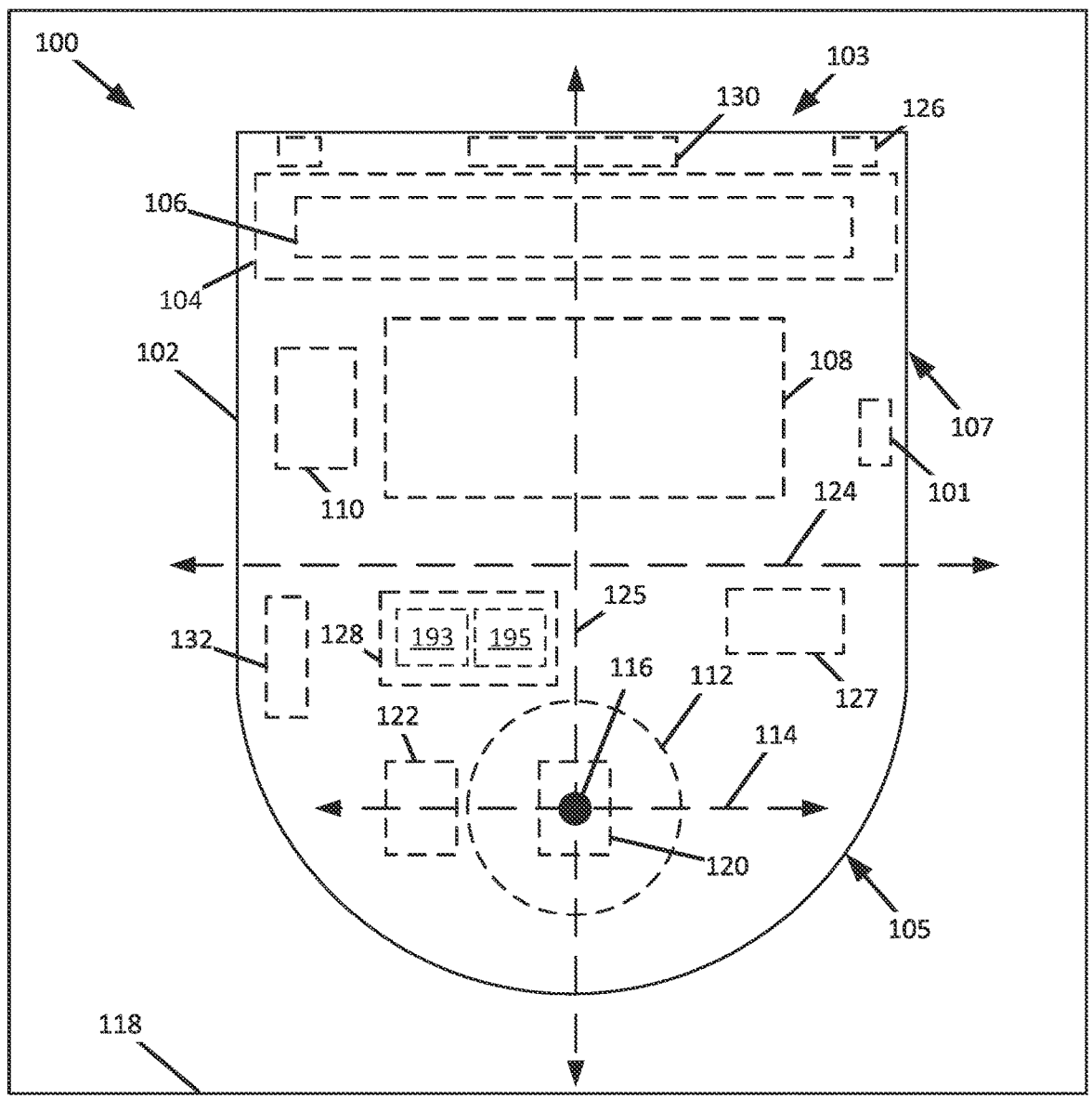
FIG. 1A is a schematic example of a robotic cleaner, consistent with embodiments of the present disclosure.

FIG. 1A shows a schematic example of a robotic cleaner 100. As shown, the robotic cleaner 100 includes a chassis 102, an agitator chamber 104 coupled to and/or defined within the chassis 102, an agitator 106 (e.g., a brush roll) rotatably disposed within (e.g., rotatably coupled to) the agitator chamber 104, a dust cup 108 removably coupled to the chassis 102 and fluidly coupled to the agitator chamber 104, and a cleaning motor assembly 110 configured to cause the agitator 106 to rotate and further configured to draw air into the agitator chamber 104 and through the dust cup 108 and through at least a portion of the cleaning motor assembly 110. After passing through the cleaning motor assembly 110, the air may be exhausted into the surrounding environment through one or more vents 101. The one or more vents 101 may be configured to direct the air flowing therethrough toward a specific location. For example, the one or more vents 101 may direct exhaust air towards a surface to be cleaned 118 and/or to one or more vertically extending surfaces (e.g., a wall) that extend from the surface to be cleaned 118. Additionally, or alternatively, the air exhausted from the cleaning motor assembly 110 may be used to provide cooling to one or more components of the robotic cleaner 100.

The chassis 102 may include a substantially planar forward surface 103 and a non-planar (e.g., arcuate) rearward surface 105. In some instances, one or more substantially planar side surfaces 107 may extend between the forward surface 103 and the rearward surface 105. As such, the chassis 102 may generally be described as having a D-shape. A D-shaped chassis 102 may allow the robotic cleaner 100 to align the forward surface 103 with a vertically extending surface (e.g., a wall) extending from the surface to be cleaned 118. As such, the robotic cleaner 100 may be able to obtain sufficient cleaning performance adjacent vertically extending surfaces without the use of one or more side brushes. A D-shaped chassis 102 may also allow a cleaning width of the robotic cleaner 100 to be maximized by allowing the agitator 106 and agitator chamber 104 to extend along a substantial portion (e.g., at least 80%, 85%, 90%, 95%, or 99%) of the forward surface 103. While the chassis 102 is shown as being D-shaped, the chassis 102 may have any other shape. For example, the chassis 102 may have a circular shape, a square shape, a triangular shape, and/or any other shape.

In some instances, the agitator 106 extends from the agitator chamber 104 in a direction of the surface to be cleaned 118 and from the agitator chamber 104 in a direction parallel to the surface to be cleaned 118. As such, at least a portion of the agitator 106 may extend from the forward surface 103 and may be the forward-most portion of the robotic cleaner 100. Such a configuration may allow the agitator 106 to clean at least a portion of a vertically extending surface (e.g., a wall) extending from the surface to be cleaned 118. In some instances, when the agitator 106 extends from the forward surface 103, the robotic cleaner 100 may be able obtain a sufficient cleaning performance adjacent vertically extending surfaces without the use of one or more side brushes.

In some instances, the agitator 106 may be, for example, a soft roller, wherein the soft roller includes pile (e.g., a velvet) extending substantially continuously around a core of the agitator 106. By way of further example, the agitator 106 may be a brush roll, wherein the brush roll includes a plurality of bristles (e.g., arranged in tufts) extending from a core of the agitator 106. By way of still further example, the agitator 106 may be a flap roller, wherein the flap roller includes one or more continuous flaps extending from a core of the agitator 106. By way of still further example, the agitator may include any combination of a pile, bristles, and/or flaps extending around and/or from a core of the agitator 106. When the agitator 106 is a soft roller, a quantity of noise generated as result of the engagement between the soft roller and the surface to be cleaned 118 may be less than a quantity of noise generated by a brush roll or a flap roller. In some instances, the agitator 106 may be removable. For example, when the agitator 106 is a soft roller, a user may replace the agitator 106 with a brush roll to obtain different cleaning characteristics (e.g., that are tailored to a surface type). By way of further example, the agitator 106 may be replaceable with a wet roller, wherein the wet roller is configured to apply a cleaning liquid to the surface to be cleaned 118 and/or agitate a cleaning liquid applied to the surface to be cleaned 118. When a wet roller is used, the dust cup 108 may be replaced with a wet cleaning module 158 (see, FIG. 1C). The wet cleaning module 158 may be configured to apply a cleaning liquid to the surface to be cleaned 118, collect dispensed/soiled cleaning liquid, and/or apply a cleaning liquid to the wet roller. For example, the wet cleaning module 158 may include a liquid pump 160 for moving a cleaning liquid from a cleaning liquid storage tank 162 to a wet roller, wherein the liquid pump 160 is actuated using the cleaning motor assembly 110 and the wet roller is rotated using the cleaning motor assembly 110. In some instances, the wet cleaning module 158 may include a mechanically agitated pad, wherein the cleaning motor assembly 110 is configured to cause the mechanically agitated pad to move. As such, the wet cleaning module 158 may generally be described as being configured to cooperate with the cleaning motor assembly 110. In some instances, the robotic cleaner 100 may be configured to identify the type of agitator (e.g., soft, flap, bristle, wet, etc.) disposed within the agitator chamber 104. In these instances, one or more cleaning behaviors may be adjusted based, at least in part, on the type of agitator identified.

The dust cup 108 can be coupled to the agitator chamber 104. As such, removal of the dust cup 108 from the chassis 102 results in the removal of the agitator chamber 104 and the agitator 106. Such a configuration may allow for the agitator 106 to be cleaned while emptying debris from the dust cup 108 and/or may mitigate a quantity of debris that inadvertently falls from an inlet of the dust cup 108 when being removed from the chassis 102. In some instances, the dust cup 108 may be configured to extend between the agitator chamber 104 and the cleaning motor assembly 110. For example, the dust cup 108 may have a tubular shape, wherein a central longitudinal axis of the dust cup 108 extends parallel to a rotation axis of the agitator 106. In some instances, at least a portion of the dust cup 108 may be transparent such that a quantity of debris collected within the dust cup 108 may be observed by a user of the robotic cleaner 100 without having to remove the dust cup 108 from the chassis 102.

The robotic cleaner 100 may further include a single drive wheel 112. The single drive wheel 112 may be rotatably coupled to the chassis 102 such that the single drive wheel 112 rotates about at least two axes of rotation. For example, the single drive wheel 112 may be rotatable about a drive axis 114 and about a steering axis 116. As shown, the drive axis 114 extends substantially (e.g., within 1°, 2°, 3°, 4°, or 5° of) parallel to the surface to be cleaned 118 and the steering axis 116 extends transverse (e.g., substantially perpendicular) to the drive axis 114 and/or the surface to be cleaned 118. The single drive wheel 112 may rotate about the steering axis 116 over a predetermined angular range. For example, the single drive wheel 112 may rotate 180° about the steering axis 116. In some instances, the single drive wheel 112 may be configured to rotate at least 360° about the steering axis 116. A drive motor 120 is configured to cause the single drive wheel 112 to rotate about the drive axis 114 and a steering motor 122 is configured to cause the single drive wheel 112 to rotate about the steering axis 116.

The single drive wheel 112 and the agitator chamber 104 may be disposed on opposing sides of a center line 124 of the chassis 102. For example, the single drive wheel 112 and the agitator chamber 104 may be positioned such that a center of mass of the robotic cleaner 100 and the agitator chamber 104 are on opposing sides of the center line 124. The center line 124 may generally be described as extending perpendicular to a forward direction of movement of the robotic cleaner 100 and through a geometric center of the chassis 102. Positioning the single drive wheel 112 and the agitator chamber 104 on opposing sides of the center line 124 may encourage an angle of the chassis 102 relative to the surface to be cleaned 118 to change in response to changes in surface type. For example, when the surface type of the surface to be cleaned 118 transitions from hard floor (e.g., hardwood or tile) to soft floor (e.g., high pile carpet), the single drive wheel 112 may compress the soft floor and lift the agitator chamber 104 away from the surface to be cleaned 118. Such a configuration may encourage consistent engagement between the agitator 106 and the surface to be cleaned 118 (e.g., encourage generation of a consistent torque at the agitator 106). In some instances, the chassis 102 may be configured to reduce a drag force generated between the chassis 102 and the surface to be cleaned 118 when the single drive wheel 112 compresses a soft floor and a separation distance between the chassis 102 at a location proximate the single drive wheel 112 and the surface to be cleaned 118 decreases. For example, a lower surface of the chassis 102 may include a convex feature extending therefrom that is configured to slidably engage the surface to be cleaned 118.

The single drive wheel 112 may be disposed along a central axis 125 of the robotic cleaner 100. The central axis 125 may generally be described as extending parallel to the forward direction of movement of the robotic cleaner 100 and through the geometric center of the chassis 102.

One or more passive wheels 126 may be rotatably coupled to the chassis 102 proximate the agitator chamber 104. As such, the chassis 102 may be supported on the surface to be cleaned 118 using the one or more passive wheels 126 and the single drive wheel 112. Additionally, or alternatively, the agitator 106 and the single drive wheel 112 may support the chassis 102 on the surface to be cleaned 118. In this instance, rotation of the agitator 106 may be configured to cooperate with the single drive wheel 112 such that the agitator 106 urges the chassis 102 along the surface to be cleaned 118.

In some instances, the robotic cleaner 100 may further include a secondary suction source 127. The secondary suction source 127 may be configured to be fluidly coupled to the agitator chamber 104 and the dust cup 108. The secondary suction source 127 may be configured to selectively draw air into the agitator chamber 104 and the dust cup 108.

The robotic cleaner 100 may further include a controller 128 and one or more sensors 130. The controller 128 may be communicatively coupled to, for example, the one or more sensors 130. The one or more sensors 130 may include one or more of, for example, one or more cliff detection sensors, one or more obstacle detection sensors, one or more surface type detection sensors, one or more wheel drop sensors, docking station detection sensors, navigation sensors (e.g., optical flow sensors, gyroscopes, inertial measurement sensors, and/or any other navigation sensor), and/or any other sensors. The controller 128 may further be communicatively coupled to, for example, one or more of the cleaning motor assembly 110, the drive motor 120, the steering motor 122, and/or the secondary suction source 127. For example, the controller 128 may change a behavior of one or more of the cleaning motor assembly 110, the drive motor 120, the steering motor 122, and/or the secondary suction source 127 based, at least in part, on input received from one or more of the one or more sensors 130. The controller 128 may be further configured to receive one or more inputs from a user interface 132 and/or from a remote device (e.g., a computer, a tablet, a smartphone, and/or any other remote device). The user interface 132 may include one or more user inputs (e.g., one or more buttons) configured to cause the robotic cleaner 100 to engage in one or more cleaning behaviors. In some instances, the user interface 132 may comprise a single button. For example, multiple presses of the single button may cause the robotic cleaner 100 to cycle between cleaning behaviors. The controller 128 may include one or more processors 193 and one or more memories 195 (e.g., a non-transitory computer readable medium), wherein the one or more processors 193 are configured to execute one or more instructions stored in one or more of the one or more memories 195 to cause the robotic cleaner 100 to carry out one or more methods of operation corresponding to the one or more instructions.

In some instances, the robotic cleaner 100 may include a plurality of sensors 130. The plurality of sensors 130 may include, for example, at least one cliff sensor and at least one obstacle sensor. The cliff sensor may be an infrared (IR) sensor or a tactile sensor configured to detect a non-traversable change in surface elevation along the surface to be cleaned 118 and the obstacle sensor may include an IR sensor and/or a tactile sensor configured to detect an obstacle in a moving path of the robotic cleaner 100. In some instances, the obstacle sensor may be an IR sensor that is further configured to detect a signal generated by a docking station, wherein the signal is used to navigate the robotic cleaner 100 to the docking station. Additionally, or alternatively, the plurality of sensors 130 may include at least one docking sensor configured to detect a signal generated by a docking station.

Figure 1B:
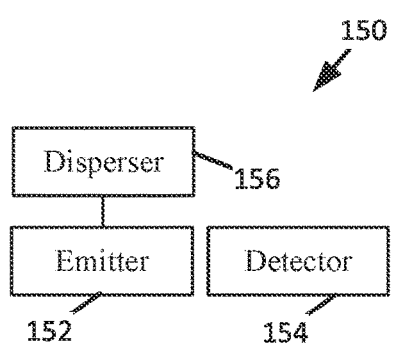
FIG. 1B shows a schematic block diagram of an example of an obstacle sensor capable of being used with the robotic cleaner of FIG. 1A, consistent with embodiments of the present disclosure.
Figure 1C:
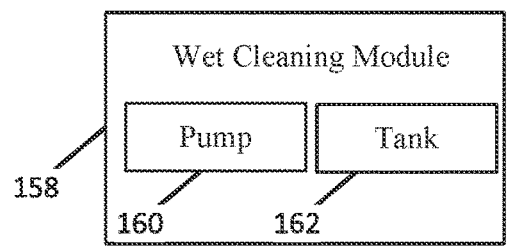
FIG. 1C shows a schematic block diagram of an example of a wet cleaning module, consistent with embodiments of the present disclosure.

As shown in FIG. 1B, an obstacle sensor 150, which may be an example of at least one of the one or more sensors 130, configured to detect obstacles using a beam of light may include a light emitter 152 (e.g., a light emitting diode) and a light detector 154 (e.g., a one-dimensional image sensor such as a complementary metal-oxide-semiconductor sensor). The light emitter 152 is configured to emit a beam of light along a direction of movement of the robotic cleaner 100. The light emitter 152 may be optically coupled to a disperser 156 (e.g., a lens) of the obstacle sensor 150, wherein the disperser 156 is configured to disperse the light passing therethrough. The dispersed light may be incident on one or more obstacles in a movement path of the robotic cleaner 100 and the incident light may be reflected back toward the robotic cleaner 100. At least a portion of the reflected light may be incident on the light detector 154. Based, at least in part, on a location and/or an intensity of light incident on the light detector 154 a location and/or a width of an obstacle relative to the robotic cleaner 100 may be determined. In other words, the location and/or width of the obstacle may be determined based, at least in part, on an intensity gradient. For example, the detected intensity of the incident light may be compared to a threshold and/or a difference between detected intensities at adjacent segments of the light detector may be determined. By way of further example, a width of an obstacle may be determined based, at least in part, on a number of pixels of the light detector having an output greater than a threshold and the distance may be determined based, at least in part, on the measured intensity at the pixels. In some instances, outputs from one or more navigation sensors (e.g., one or more inertial measurement units and/or one or more optical flow sensors) may be used with the output from the obstacle sensor 150 to determine a location and/or a width of an obstacle. The light emitter 152 may be configured emit IR light and the light detector 154 may be configured to detect IR light.

Figure 2:
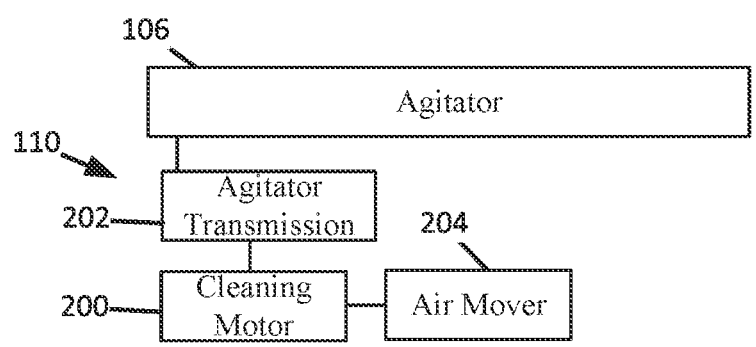
FIG. 2 is a schematic block diagram of a cleaning motor assembly coupled to an agitator of the robotic cleaner of FIG. 1, consistent with embodiments of the present disclosure.

FIG. 2 shows a schematic block diagram of the cleaning motor assembly 110 coupled to the agitator 106. As shown, the cleaning motor assembly 110 includes a cleaning motor 200. The cleaning motor 200 is coupled to an agitator transmission 202 and an air mover 204 such that the cleaning motor 200 transfers rotational motion to both the agitator transmission 202 and the air mover 204. The agitator transmission 202 is coupled to the agitator 106 such that rotational motion is transferred from the cleaning motor 200 to the agitator 106 via the agitator transmission 202. The agitator transmission 202 may be configured to increase (or decrease) an amount of torque (or a rotational speed) of the agitator 106 relative to the cleaning motor 200. The agitator transmission 202 may include, for example, one or more of one or more belts, gears, and/or any other coupling capable to transferring rotational motion from the cleaning motor 200 to the agitator 106. In some instances, the agitator transmission 202 may be a continuously variable transmission (CVT). For example, a CVT belt drive may be used to dynamically adjust a rotational speed of the agitator 106 without adjusting a rotational speed of the air mover 204. Such a configuration may allow the rotational speed of the agitator 106 to be adjusted based, at least in part, on, for example, surface type without impacting a rotation speed of the air mover 204.

The air mover 204 may be any structure capable of moving a volume of air. For example, the air mover 204 may be an impeller, a blower, a fan, and/or any other structure capable of moving a volume of air. The air mover 204 may be directly coupled to the drive shaft of the cleaning motor 200 or coupled to a transmission configured to transfer rotational motion from the cleaning motor 200 to the air mover 204. In some instances, a rotational speed of the air mover 204 may measure at least five times greater than a rotational speed of the agitator 106. In some instances, the transmission coupled to the air mover 204 may be configured to vary a rotational speed of the air mover 204 (e.g., to adjust a suction force generated by the air mover 204).

In some instances, the air mover 204 may be a crossflow blower. A crossflow blower may generate less noise, when compared to a radial blower, have an increased air flow when compared to other air movers, have increased efficiency when compared to other air movers, and have a larger intake when compared to other air movers. A larger intake may reduce a quantity of ducting within the robotic cleaner 100. Use of a crossflow blower may encourage high airflow when a low restriction airflow path is present. A crossflow blower may have a relatively lower static pressure when compared to other air movers. As such, the secondary suction source 127 may be used to increase (e.g., selectively increase) the static pressure. Selective activation of the secondary suction source 127 may encourage optimization of static pressure and energy consumption. As such, efficiency gains achieved by using a crossflow blower may be maximized while mitigating the effects of a decreased static pressure. The secondary suction source 127 may be further configured to selectively augment a pressure gradient across the crossflow blower. Such a configuration allows the crossflow blower to operate efficiently in a high back pressure environment (e.g., when a filter medium is clogged and/or the surface to be cleaned includes a thick pile).

Air drawn into the agitator chamber 104 and through the dust cup 108 may pass through a filter medium before passing through the air mover 204. Such a configuration may mitigate the collection of debris on the air mover 204 during operation and/or reduce a quantity of debris exhausted from the air mover 204 and into a surrounding environment. In some instances, the air mover 204 may be configured to exhaust air passing therethrough into a surrounding environment using the one or more vents 101. The one or more vents 101 can be configured to direct exhaust air toward a specific location (e.g., to urge debris into a movement path of the robotic cleaner 100). Additionally, or alternatively, air exhausted from air mover 204 may, in some instances, be used to cool one or more components of the robotic cleaner 100 before being exhausted into the surrounding environment. In instances where the robotic cleaner 100 includes a wet module, the exhaust air may not be utilized to cool one or more components of the robotic cleaner (e.g., to mitigate moisture collection on one or more electronic components). In these instances, the vents 101 may be configured to urge exhaust air towards the surface to be cleaned 118 such that the exhaust air encourages a drying of residual cleaning liquid on the surface to be cleaned 118. In some instances, air being exhausted from the air mover 204 may pass through an additional filter medium (e.g., a high efficiency particulate air filter) before being exhausted into the surrounding environment.

FIGS. 3-6 collectively illustrate an example of a method of operation for the robotic cleaner 100 of FIG. 1A, wherein the method of operation is a method of cleaning an edge (e.g., as defined by a vertically extending surface 300, such as a wall, that extends from the surface to be cleaned 118). As shown in FIG. 3, the robotic cleaner 100 approaches the vertically extending surface 300 until the robotic cleaner 100 engages (e.g., contacts) a portion of the vertically extending surface 300. When the robotic cleaner 100 engages the vertically extending surface 300 (e.g., as detected by at least one of the one or more sensors 130), the single drive wheel 112 is caused to rotate about the steering axis 116. For example, and as shown in FIG. 4, the single drive wheel 112 may rotate about the steering axis 116 until the drive axis 114 intersects a corner 400 defined by the intersection of the forward surface 103 with a respective side surface 107. When the drive axis 114 intersects the corner 400, the single drive wheel 112 may be caused to rotate about the drive axis 114 in a forward direction until the forward surface 103 aligns with (e.g., extends substantially parallel to) the vertically extending surface 300, as shown in FIG. 5. At least one of the one or more sensors 130 may indicate that the forward surface 103 is aligned with the vertically extending surface 300. In response to the forward surface 103 aligning with the vertically extending surface 300, the single drive wheel 112 may be rotated about the drive axis 114 in a reverse direction until at least one side surface 107 aligns with (e.g., extends substantially parallel to) the vertically extending surface 300, as shown in FIG. 6. When at least one side surface 107 aligns with the vertically extending surface 300, the single drive wheel 112 is caused to rotate about the steering axis 116 until the drive axis 114 is substantially parallel to the forward surface 103 (e.g., such that the drive axis 114 is substantially perpendicular to the vertically extending surface 300). When the drive axis 114 is substantially parallel to the forward surface 103, the single drive wheel 112 is caused to rotate about drive axis 114 in a forward direction, moving the robotic cleaner 100 along the vertically extending surface 300.

The method shown in FIGS. 3-6 may also be used to determine an orientation of the vertically extending surface 300 relative to the robotic cleaner 100. The orientation may then be used to calibrate a cleaning and/or navigation behavior of the robotic cleaner 100. For example, sensor drift caused by mismeasurements of orientation and/or acceleration by an inertial measurement unit (IMU) may cause the robotic cleaner 100 to follow an unintended navigation path. By calibrating the IMU based on an orientation of the vertically extending surface 300 relative to the robotic cleaner 100 each time the vertically extending surface 300 is encountered, the robotic cleaner 100 may correct for the mismeasurements in orientation and/or acceleration. Such a configuration may allow the robotic cleaner 100 to perform more complex navigation behaviors without the use of additional navigational sensors (e.g., one or more cameras or one or more light detection and ranging sensors). For example, when cleaning according to a corn-row pattern (e.g., a pattern having a series of parallel lines that extends between opposing vertical surfaces), the vertically extending surface 300 may be used to adjust a position and/or orientation of the robotic cleaner 100 relative to the vertically extending surface 300 such that the robotic cleaner 100 travels away from the vertically extending surface 300 in a direction that extends substantially perpendicular to the vertically extending surface 300. In some instances, the orientation of the vertically extending surface 300 relative to the robotic cleaner 100 may be stored in a map for later navigational purposes.

FIGS. 7-10 collectively illustrate an example of a method of operation for the robotic cleaner 100 of FIG. 1A, wherein the method of operation is a method of cleaning an edge (e.g., as defined by a vertically extending surface 700, such as a wall, that extends from the surface to be cleaned 118). As shown in FIG. 7, the robotic cleaner 100 approaches the vertically extending surface 700 until the robotic cleaner 100 engages (e.g., contacts) a portion of the vertically extending surface 700. When the robotic cleaner 100 engages the vertically extending surface 700 (e.g., as detected by at least one of the one or more sensors 130), the single drive wheel 112 is caused to rotate about the steering axis 116. For example, and as shown in FIG. 8, the single drive wheel 112 may rotate about the steering axis 116 until the drive axis 114 intersects a corner 800 defined between the forward surface 103 and a respective side surface 107. When the drive axis 114 intersects the corner 800, the single drive wheel 112 may be caused to rotate about the drive axis 114 in a forward direction until the forward surface 103 aligns with (e.g., extends substantially parallel to) the vertically extending surface 700, as shown in FIG. 9. At least one of the one or more sensors 130 may indicate that the forward surface 103 is aligned with the vertically extending surface 700. In response to the forward surface 103 aligning with the vertically extending surface 700, the single drive wheel 112 is caused to rotate about the steering axis 116 such that the drive axis 114 rotates towards an orientation in which the drive axis 114 intersects the forward surface 103 at an intersection angle θ that measures within 1°, 2°, 5°, 10°, 15°, or 20° of 90°. When the intersection angle θ measures within 1°, 2°, 5°, 10°, 15°, or 20° of 90°, the single drive wheel 112 may caused to rotate about the drive axis 114 in a forward direction such that the forward surface 103 is caused to move along the vertically extending surface 700, as shown in FIG. 10. Such a configuration may allow the agitator 106 to clean adjacent to the vertically extending surface 700. In instances where the agitator 106 extends from the forward surface 103, the agitator 106 may engage (e.g., contact) the vertically extending surface 700, cleaning at least a portion of the vertically extending surface 700.

FIGS. 11-14 collectively illustrate an example method of operation for the robotic cleaner 100 of FIG. 1A, wherein the method of operation is a method of obstacle cleaning and avoidance. An obstacle may generally be described as including one or more vertically extending surfaces that extend from the surface to be cleaned 118, wherein a length of the one or more vertically extending surfaces may measure less than a corresponding length of the forward surface 103 of the chassis 102 (e.g., an obstacle may be a leg of a chair, bed, or table).

As shown in FIG. 11, the robotic cleaner 100 approaches an obstacle 1100 until the robotic cleaner 100 engages (e.g., contacts) the obstacle 1100. When the robotic cleaner 100 engages the obstacle 1100, the robotic cleaner 100 determines whether the obstacle 1100 has a length that measures less than a corresponding length of the forward surface 103 and a location of the obstacle 1100 relative to the robotic cleaner 100 (e.g., using output from a one-dimensional image sensor). In response to determining that the obstacle 1100 has a length that measures less than a length of the forward surface 103, the single drive wheel 112 is caused to rotate about the steering axis 116 until the drive axis 114 intersects with the forward surface 103, as shown in FIG. 12. The direction of rotation of the single drive wheel 112 about the steering axis 116 may be based, at least in part, on a location of the obstacle 1100 relative to the robotic cleaner 100 (e.g., relative to the forward surface 103 of the robotic cleaner 100). For example, the drive axis 114 may intersect with the forward surface 103 at a location between the obstacle 1100 and a corner 1200 (e.g., the corner 1200 may be the corner of the robotic cleaner 100 closest the obstacle 1100), the corner 1200 being defined at the intersection of the forward surface 103 with a respective side surface 107. In some instances, the drive axis 114 may extend perpendicular to the obstacle 1100. As shown in FIGS. 13 and 14, when the drive axis 114 intersects the forward surface 103, the single drive wheel 112 is caused to rotate in the forward direction which causes the robotic cleaner 100 to move around the obstacle 1100. When moving around the obstacle 1100, the forward surface 103 moves along the obstacle 1100 such that the agitator 106 can clean adjacent to the obstacle 1100. In instances where the agitator 106 extends from the forward surface 103, the agitator 106 may contact the obstacle 1100, cleaning at least a portion of the obstacle 1100. The robotic cleaner 100 may be configured to determine if an entire perimeter of the obstacle 1100 has been traversed (e.g., using the output of a gyroscope). When the robotic cleaner 100 has traversed the entire perimeter of the obstacle 1100, the single drive wheel 112 may be rotated about the steering axis 116 such that forward or rearward rotation of the single drive wheel 112 urges the robotic cleaner 100 away from the obstacle 1100, allowing the robotic cleaner 100 to resume cleaning a remainder of the surface to be cleaned 118.

FIGS. 15-19 collectively illustrate an example method of operation for the robotic cleaner 100 of FIG. 1A, wherein the method of operation is a method for escaping from a wedged condition. A wedged condition can generally be described as a situation where the robotic cleaner 100 is positioned between two opposing vertically extending surfaces and is incapable of further forward movement and is incapable of reverse movement as a result of frictional forces generated between the robotic cleaner 100 and the two opposing vertically extending surfaces.

As shown in FIG. 15, the robotic cleaner 100 is in a wedged condition between two opposing vertically extending surfaces 1500 and 1502. When the robotic cleaner 100 is in a wedged condition, the single drive wheel 112 may be caused to rotate about the steering axis 116 until a rotational plane 1600 (e.g., a central rotational plane) of the single drive wheel 112 intersects a first corner 1602 defined at the intersection of the forward surface 103 and a respective side surface 107, as shown in FIG. 16. The rotational plane 1600 may generally be described as the plane in which the single drive wheel 112 rotates when rotating about the drive axis 114. In other words, the drive axis 114 extends perpendicular to the rotational plane 1600. When the rotational plane 1600 intersects the first corner 1602, the single drive wheel 112 may be caused to rotate about the drive axis 114 in a reverse direction for a predetermined time, as shown in FIG. 17. After rotating the single drive wheel 112 in the reverse direction for the predetermined time, the robotic cleaner 100 may be configured to determine if the wedged condition has been resolved. If the wedge condition remains after the predetermined time, the single drive wheel 112 is caused to rotate about the steering axis 116 until the rotational plane 1600 intersects a second corner 1800 defined at another intersection of the forward surface 103 and another side surface 107, as shown in FIG. 18. The first corner 1602 and the second corner 1800 may be on opposing ends of the forward surface 103. When the rotational plane 1600 intersects the second corner 1800, the single drive wheel 112 may be caused to rotate about the drive axis 114 in a reverse direction for a predetermined time, as shown in FIG. 19. After rotating the single drive wheel 112 in the reverse direction for the predetermined time, the robotic cleaner 100 may be configured to determine if the wedged condition has been resolved. If the wedge condition remains after the predetermined time, the single drive wheel 112 may be caused to rotate about the steering axis 116 until the rotational plane 1600 intersects the first corner 1602 and the method described in relation to FIGS. 16-19 may be repeated until the wedged condition is resolved and/or for a predetermined number of repetitions.

One or more steps of the methods described in relation to FIGS. 3-19 may be embodied as one or more instructions stored in one or more memories (e.g., one or more non-transitory memories), wherein the one or more instructions are configured to be executed on one or more processors. For example, the controller 128 may be configured to cause one or more steps of the methods to be carried out. Additionally, or alternatively, one or more steps of the methods may be carried out in any combination of software, firmware, and/or circuitry (e.g., an application-specific integrated circuit).

An example of a robotic cleaner, consistent with the present disclosure, may include a chassis, a single drive wheel rotatably coupled to the chassis, the single drive wheel being configured to rotate about a steering axis and a drive axis, an agitator chamber having an agitator rotatable therein, and a cleaning motor assembly configured to cause the agitator to rotate and further configured to cause air to flow into the agitator chamber.

In some instances, the cleaning motor assembly may include a cleaning motor, an agitator transmission, and an air mover configured to be rotated by the cleaning motor, the agitator transmission being configured to transfer rotational motion from the cleaning motor to the agitator. In some instances, the air mover may be a crossflow blower. In some instances, the air mover may be configured to exhaust air into a surrounding environment through one or more vents. In some instances, the chassis may include a substantially planar forward surface and an arcuate rearward surface. In some instances, at least a portion of the agitator may extend from the forward surface. In some instances, the chassis may be D-shaped. In some instances, the single drive wheel and the agitator chamber may be on opposing sides of a center line of the chassis. In some instances, the robotic cleaner may further include an obstacle sensor, the obstacle sensor including an emitter, a detector, and a disperser, the emitter being optically coupled to the disperser. In some instances, the detector may be a one-dimensional image sensor.

Another example of a robotic cleaner, consistent with the present disclosure, may include a chassis having a substantially planar forward surface and one or more substantially planar side surfaces, a single drive wheel rotatably coupled to the chassis, the single drive wheel being configured to rotate about a steering axis and a drive axis, an agitator chamber having an agitator rotatable therein, a cleaning motor assembly configured to cause the agitator to rotate and further configured to cause air to flow into the agitator chamber, and a controller having one or more processors and one or more memories, the one or more memories being configured to store one or more instructions corresponding to a method of operation, the one or more processors being configured to execute the one or more instructions to cause the robotic cleaner to carry out the method of operation.

In some instances, the method of operation may be a method of cleaning an edge. The method of cleaning the edge may include approaching a vertically extending surface, engaging the vertically extending surface, rotating the single drive wheel about the steering axis until the drive axis intersects a corner defined at an intersection of the forward surface and a respective side surface, in response to the drive axis intersecting the corner, rotating the single drive wheel in a forward direction until the forward surface is aligned with the vertically extending surface, in response to the forward surface being aligned with the vertically extending surface, rotating the single drive wheel about the drive axis in a reverse direction until the respective side surface is aligned with the vertically extending surface, and in response to the respective side surface being aligned with the vertically extending surface, rotating the single drive wheel about the steering axis until the drive axis extends substantially parallel to the forward surface and rotating the single drive wheel about the drive axis in the forward direction. In some instances, the method of operation may be a method of cleaning an edge. The method of cleaning the edge may include approaching a vertically extending surface, engaging the vertically extending surface, rotating the single drive wheel about the steering axis until the drive axis intersects a corner defined at an intersection of the forward surface and a respective side surface, in response to the drive axis intersecting the corner, rotating the single drive wheel about the drive axis in a forward direction until the forward surface is aligned with the vertically extending surface, in response to the forward surface being aligned with the vertically extending surface, rotating the single drive wheel about the steering axis until the drive axis intersects the forward surface at an intersection angle, and in response to the drive axis intersecting the forward surface at the intersection angle, rotating the single drive wheel about the drive axis in the forward direction. In some instances, the intersection angle may measure within 20° of 90°. In some instances, the method of operation may be a method of cleaning an obstacle. The method of cleaning the obstacle may include approaching the obstacle, engaging the obstacle, rotating the single drive wheel about the steering axis until the drive axis intersects with the forward surface, and in response to the drive axis intersecting the forward surface, rotating the single drive wheel in a forward direction about the drive axis. In some instances, the method of cleaning the obstacle may further include determining whether the robotic cleaner has traversed an entire perimeter of the obstacle. In some instances, the method of operation may be a method of escaping from a wedged condition. The method of escaping the wedged condition may include rotating the single drive wheel about the steering axis until a rotational plane of the single drive wheel intersects a first corner defined at an intersection of the forward surface with a respective side surface, in response to the rotational plane intersecting the first corner, rotating the single drive wheel about the drive axis in a reverse direction, rotating the single drive wheel about the steering axis until the rotational plane intersects a second corner defined at another intersection of the forward surface with another side surface, and in response to the rotational plane intersecting the second corner, rotating the single drive wheel about the drive axis in the reverse direction. In some instances, the method of escaping the wedged condition may include, in response to rotating the single drive wheel about the drive axis in the reverse direction, determining whether the wedged condition has been resolved.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A robotic cleaner comprising:
   a chassis having a substantially planar forward surface and one or more substantially planar side surfaces;
   a single drive wheel rotatably coupled to the chassis, the single drive wheel being configured to rotate about a steering axis and a drive axis;
   an agitator chamber having an agitator rotatable therein;
   a cleaning motor assembly configured to cause the agitator to rotate and further configured to cause air to flow into the agitator chamber; and
   a controller configured to cause the robotic cleaner to:
   approach a vertically extending surface;
   engage the vertically extending surface;
   rotate the single drive wheel about the steering axis until the drive axis intersects a corner defined at an intersection of the forward surface and a respective side surface;
   in response to the drive axis intersecting the corner, rotate the single drive wheel in a forward direction until the forward surface is aligned with the vertically extending surface;
   in response to the forward surface being aligned with the vertically extending surface, rotate the single drive wheel about the drive axis in a reverse direction until the respective side surface is aligned with the vertically extending surface; and
   in response to the respective side surface being aligned with the vertically extending surface, rotate the single drive wheel about the steering axis until the drive axis extends substantially parallel to the forward surface and rotating the single drive wheel about the drive axis in the forward direction.

2. The robotic cleaner of claim 1, wherein the cleaning motor assembly includes a cleaning motor, an agitator transmission, and an air mover configured to be rotated by the cleaning motor, the agitator transmission being configured to transfer rotational motion from the cleaning motor to the agitator.

3. The robotic cleaner of claim 2, wherein the air mover is a crossflow blower.

4. The robotic cleaner of claim 2, wherein the air mover is configured to exhaust air into a surrounding environment through one or more vents.

5. The robotic cleaner of claim 1, wherein the chassis includes an arcuate rearward surface.

6. The robotic cleaner of claim 5, wherein at least a portion of the agitator extends from the forward surface.

7. The robotic cleaner of claim 5, wherein the chassis is D-shaped.

8. The robotic cleaner of claim 1, wherein the single drive wheel and the agitator chamber are on opposing sides of a center line of the chassis.

9. The robotic cleaner of claim 1 further comprising an obstacle sensor, the obstacle sensor including an emitter, a detector, and a disperser, the emitter being optically coupled to the disperser.

10. The robotic cleaner of claim 9, wherein the detector is a one-dimensional image sensor.

11. A robotic cleaner comprising:
    a chassis having a substantially planar forward surface and one or more substantially planar side surfaces;
    a single drive wheel rotatably coupled to the chassis, the single drive wheel being configured to rotate about a steering axis and a drive axis;
    an agitator chamber having an agitator rotatable therein;
    a cleaning motor assembly configured to cause the agitator to rotate and further configured to cause air to flow into the agitator chamber; and
    a controller configured to cause the robotic cleaner to:
    approach a vertically extending surface;
    engage the vertically extending surface;
    rotate the single drive wheel about the steering axis until the drive axis intersects a corner defined at an intersection of the forward surface and a respective side surface;
    in response to the drive axis intersecting the corner, rotate the single drive wheel about the drive axis in a forward direction until the forward surface is aligned with the vertically extending surface;
    in response to the forward surface being aligned with the vertically extending surface, rotate the single drive wheel about the steering axis until the drive axis intersects the forward surface at an intersection angle; and
    in response to the drive axis intersecting the forward surface at the intersection angle, rotate the single drive wheel about the drive axis in the forward direction.

12. The robotic cleaner of claim 11, wherein the intersection angle is within 20° of 90°.

13. The robotic cleaner of claim 11, wherein the cleaning motor assembly includes a cleaning motor, an agitator transmission, and an air mover configured to be rotated by the cleaning motor, the agitator transmission being configured to transfer rotational motion from the cleaning motor to the agitator.

14. The robotic cleaner of claim 11 further comprising an obstacle sensor, the obstacle sensor including an emitter, a detector, and a disperser, the emitter being optically coupled to the disperser.

15. A robotic cleaner comprising:
a chassis having a substantially planar forward surface and one or more substantially planar side surfaces;
a single drive wheel rotatably coupled to the chassis, the single drive wheel being configured to rotate about a steering axis and a drive axis;
an agitator chamber having an agitator rotatable therein;
a cleaning motor assembly configured to cause the agitator to rotate and further configured to cause air to flow into the agitator chamber; and
a controller, the controller, in response to determining that the robotic cleaner is in a wedged condition, is configured to cause the robotic cleaner to:
rotate the single drive wheel about the steering axis until a rotational plane of the single drive wheel intersects a first corner defined at an intersection of the forward surface with a respective side surface;
in response to the rotational plane intersecting the first corner, rotate the single drive wheel about the drive axis in a reverse direction;
rotate the single drive wheel about the steering axis until the rotational plane intersects a second corner defined at another intersection of the forward surface with another side surface; and in response to the rotational plane intersecting the second corner, rotate the single drive wheel about the drive axis in the reverse direction.

16. The robotic cleaner of claim 15, wherein, in response to rotating the single drive wheel about the drive axis in the reverse direction, the controller is configured to determine whether the wedged condition has been resolved.

* * * * *